United States Patent [19]

Higuchi et al.

[11] Patent Number: 4,674,080
[45] Date of Patent: Jun. 16, 1987

[54] DISC LOADING AND UNLOADING APPARATUS FOR USE IN A DISC PLAYER

[75] Inventors: Kunio Higuchi, Kanagawa; Shunichi Miyazono, Chiba; Tsutomu Toyogucyi, Tokyo, all of Japan

[73] Assignee: Sony Corporation, Tokyo, Japan

[21] Appl. No.: 779,635

[22] Filed: Sep. 24, 1985

[30] Foreign Application Priority Data

Sep. 29, 1984 [JP] Japan .................. 59-204641

[51] Int. Cl.[4] .................. G11B 19/10; G11B 1/00; G11B 17/04; G11B 25/04
[52] U.S. Cl. .................................. 369/77.2
[58] Field of Search .......................... 369/77.2

[56] References Cited

U.S. PATENT DOCUMENTS 4,500,983  2/1985  Sugiyama et al. .............. 369/77.2
4,578,787  3/1986  Shimizu et al. ................ 369/77.2

FOREIGN PATENT DOCUMENTS 114159  9/1981  Japan ............................. 369/77.2

*Primary Examiner*—Steven L. Stephan
*Attorney, Agent, or Firm*—Lewis H. Eslinger; Alvin Sinderbrand

[57] ABSTRACT

Apparatus for use in a disc player comprises a loading and unloading mechanism for performing selectively a disc loading operation in which a disc inserted into the disc player through an opening for disc insertion is carried to and loaded on a disc rotating device and a disc unloading operation in which the disc is unloaded from the disc rotating device, returned to the opening, and positioned therein with a portion of the disc protruding through the opening. If the disc is accompanied by a protective disc case engaged in the opening, the portion of the disc protruding through the opening is received within the case. If the disc is not accompanied by a disc case, the portion of the disc protruding through the opening is exposed to the outside of the disc player and may collect dirt, become damaged, etc. A discriminator detects the presence or absence of a disc case engaged within the opening, and a drive control is responsive to the discriminator for controlling the loading and unloading mechanism to reload the disc a predetermined time after the disc is positioned in the opening if no disc case is engaged within the opening and to allow the disc to remain indefinitely in the opening if a disc case is engaged therein for protection of the disc.

9 Claims, 5 Drawing Figures

DISC LOADING AND UNLOADING APPARATUS FOR USE IN A DISC PLAYER

BACKGROUND OF THE INVENTION

1. Field of the Invention

This invention relates to apparatus for use in disc players and, more particularly, to novel and highly-effective disc loading and unloading apparatus for automatically engaging a disc that has been inserted into a disc player through an opening for disc insertion and for selectively loading the disc on a disc rotating device provided in the disc player and unloading the disc from the disc rotating device.

2. Description of the Prior Art

Several forms of disc loading and unloading apparatus have been proposed for loading a disc that is used for recording or reproduction of an information signal on a disc rotating device provided in a disc player and unloading the disc from the disc rotating device. One such disc loading and unloading apparatus, which has been proposed for miniaturizing the disc player, has a loading arm supported on a stationary structure so as to be rotatable, a drive roller mounted on the loading arm and caused to rotate, and an idler roller attached to the stationary structure and positioned above the drive roller.

In the disc loading operation of such a disc loading and unloading apparatus, the loading arm is so positioned that the drive roller engages the idler roller and is driven in rotation thereby, and a disc is received between the drive roller and the idler roller and carried to a position above the disc rotating device by rotation of the drive roller. Then the loading arm is rotated to cause the drive roller to descend, so that the disc, which rests on the drive roller, also descends and engages the disc rotating device. Afterwards, the loading arm is further rotated to cause the drive roller to descend farther so as to be spaced apart from the disc on the disc rotating device. In this manner, the disc is automatically loaded on the disc rotating device.

In the disc unloading operation of the disc loading and unloading apparatus described above, the loading arm is rotated to cause the drive roller to ascend to remove the disc from the disc rotating device. The disc removed from the disc rotating device ascends together with the drive roller and is received between the drive roller and the idler roller. Then the drive roller is caused to rotate in the direction opposite to the direction of rotation in the disc loading operation, so that the disc is carried toward the opening for disc insertion by the drive roller and the idler roller rotating together. After the rotation of the drive roller is completed, the disc is held at the opening for disc insertion with a portion thereof protruding through the opening. If the disc is not accompanied by a protective disc case, the portion of the disc protruding through the opening is exposed to the outside of the disc player. If a disc case is engaged in the opening, the portion of the disc protruding through the opening is received within the disc case. In either case, the disc is automatically unloaded from the disc rotating device and can be easily withdrawn from the disc player.

If the disc is not accompanied by the disc case and is continuously held at the opening for disc insertion with a portion thereof exposed through the opening to the outside of the disc player for a relatively long time after being unloaded, the portion of the disc exposed to the outside of the disc player becomes covered with dust and is likely to be damaged by something colliding therewith. As a result, signal reproduction from the disc cannot be performed properly.

An improved disc loading and unloading apparatus that avoids such an undesirable situation as mentioned above in connection with the disc without the disc case has been proposed by the assignee of the present application in Japanese patent application No. 59/172794, filed Aug. 20, 1984. This improved disc loading and unloading apparatus has a loading and unloading mechanism for performing selectively a disc loading operation in which a disc inserted into a disc player through an opening for disc insertion is loaded on a disc rotating device provided in the disc player and a disc unloading operation in which the disc is removed from the disc rotating device, carried to the opening for disc insertion, and then held at the opening with a portion thereof exposed through the opening to the outside of the disc player. Drive control means is provided for controlling the loading and unloading mechanism to commence automatically the disc loading operation when it is detected that the disc has been continuously held at the opening for disc insertion with a portion thereof exposed to the outside of the disc player for a predetermined duration after being unloaded. In the operation of such an improved disc loading and unloading apparatus, when the disc has been continuously held at the opening for disc insertion with a portion thereof exposed to the outside of the disc player for the predetermined duration after the disc unloading operation, it is automatically loaded again on the disc rotating device, so as to be prevented from continuing indefinitely to be held at the opening with a portion thereof exposed to the outside of the disc player.

However, in the disc player employing the improved disc loading and unloading apparatus mentioned above, there is an inconvenience arising with use of a disc accompanied by a disc case. A disc accompanied by a disc case is contained in the disc case when it is not in use. When the disc is in use, the disc case is engaged within the opening for disc insertion and the disc is drawn out of the disc case by a disc handling device provided in the disc player. The disc withdrawn from the disc case undergoes the same disc loading and unloading operations as a disc used without a disc case, and is then reinserted into the disc case after the disc unloading operation. Accordingly, even if the disc is continuously held at the opening for disc insertion for a relatively long time after being unloaded, there is no risk of the disc becoming covered with dust or of the disc being damaged by objects colliding therewith. This means that it is not necessary to load the disc again on the disc rotating device when the disc has been continuously held at the opening for disc insertion for the predetermined duration after being unloaded. If the disc loading operation is uselessly performed for automatically loading the disc again on the disc rotating device when the disc has been continuously held at the opening for disc insertion for the predetermined duration after being unloaded, an extra disc unloading operation must be carried out when a user of the disc player wishes to remove the disc therefrom. This necessitates undesirable waiting time.

OBJECTS AND SUMMARY OF THE INVENTION

An object of the present invention is to provide, for use in a disc player, disc loading and unloading apparatus that avoids the disadvantages described above that are inherent in conventional disc loading and unloading apparatus.

Another object of the invention is to provide apparatus that automatically loads and unloads a disc onto and from a disc rotating device, carries the unloaded disc to the opening for disc insertion so that it protrudes through the opening, and selectively permits it to remain there indefinitely if a disc case is engaged in the opening for disc insertion, so that the protruding portion of the disc is protected, or automatically reloads the disc after a predetermined time interval if no disc case is engaged in the opening.

In accordance with an aspect of the present invention, the foregoing and other objects are attained in apparatus for use in a disc player; comprising: loading and unloading means for performing selectively a disc loading operation in which a disc inserted into the disc player through an opening for disc insertion is carried to and loaded on a disc rotating device and a disc unloading operation in which the disc is removed from the disc rotating device, returned to the opening, and positioned therein with a portion of the disc protruding through the opening so that such portion is exposed to the outside of the disc player or received within a disc case engaged within the opening; discrimination means for detecting the presence or absence of a disc case engaged within the opening; and drive control means responsive to the discrimination means for controlling the loading and unloading means to reload the disc a predetermined time after the disc is positioned in the opening if no disc case is engaged within the opening and to allow the disc to remain indefinitely in the opening if a disc case is engaged therein for protection of the disc.

BRIEF DESCRIPTION OF THE DRAWINGS

A better understanding of the objects, features and advantages of the invention can be gained from the following detailed description of the preferred embodiment thereof, in conjunction with the appended figures of the drawings, wherein like reference characters designate like parts, and wherein.

DESCRIPTION OF THE PREFERRED EMBODIMENT

In apparatus in accordance with the present invention, when a disc is unloaded, i.e., removed from the disc rotating device, it is returned to the opening for disc insertion with a portion thereof protruding through the opening. If the disc is unaccompanied by a disc case, the protruding portion is exposed to the outside of the disc player. If the disc is accompanied by a disc case which is engaged within the opening for disc insertion, the portion of the disc protruding through the disc insertion opening to the outside of the disc player is received within the disc case. In accordance with the invention, discriminating means detects whether or not the disc case is enaged within the opening for disc insertion. If the discriminating means detects the absence of the disc case, a drive control means measures the time elapsing after the unloaded disc arrives at the opening for disc insertion and causes the loading and unloading mechanism to execute the disc loading operation when the measured time reaches the predetermined value, so that the disc does not remain indefinitely exposed to the outside of the disc player. On the other hand, if the discriminating means detects the presence of the disc case, the drive control means prevents the loading and unloading mechanism from executing the disc loading operation in the situation wherein the unloaded disc is held at the opening for disc insertion.

In short, the disc unaccompanied by a protective disc case is prevented from being held for more than a brief period at the opening for disc insertion with a portion thereof exposed to the outside of the disc player. If during this brief period the disc is not removed by a user of the disc player, the disc is unloaded. The disc is therefore safeguarded against becoming covered with dust or being damaged by objects colliding therewith. On the other hand, if the disc is accompanied by a protective disc case, it remains at the opening for disc insertion with a portion thereof inserted into the disc case so that it can be conveniently and quickly removed from the disc player.

Figure 1:
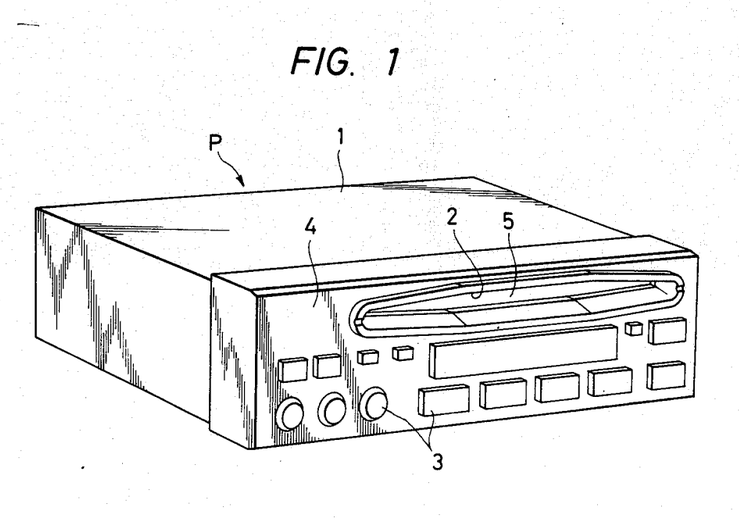
FIG. 1 is a perspective view of the exterior of an optical disc player to which apparatus according to the present invention is applicable.
Figure 2:
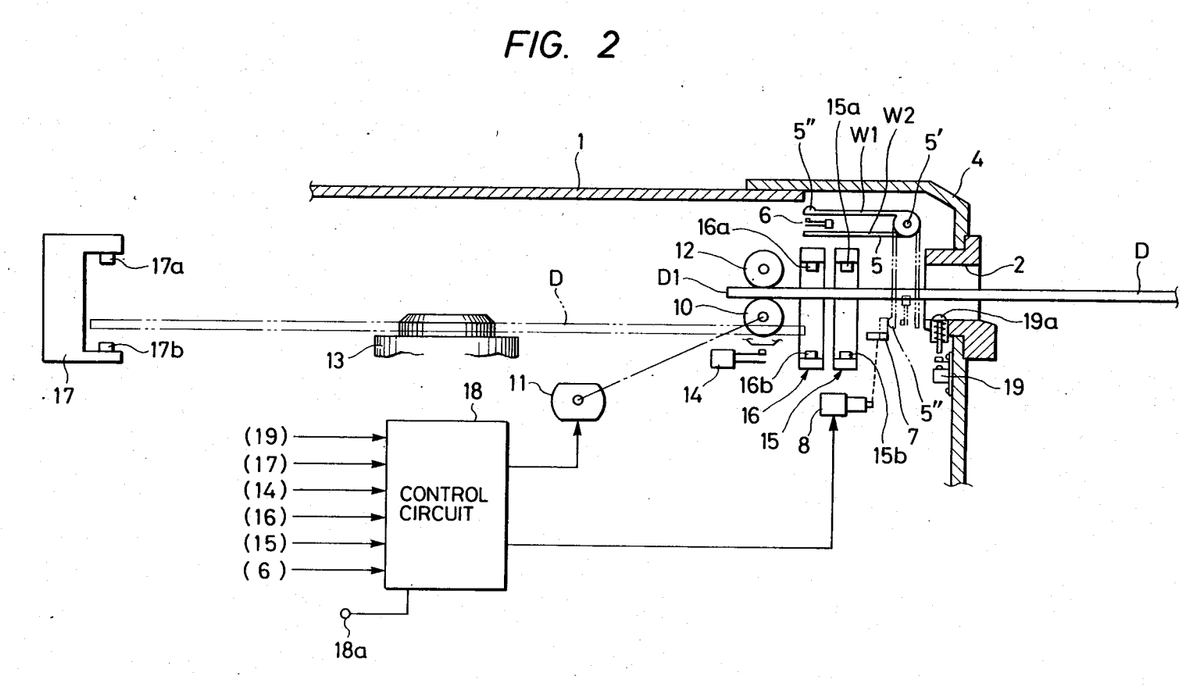
FIG. 2 is a partial longitudinal sectional view of the apparatus of FIG. 1 taken in a vertical plane and showing a preferred embodiment of apparatus according to the present invention, together with a disc inserted therein.
Figure 3:
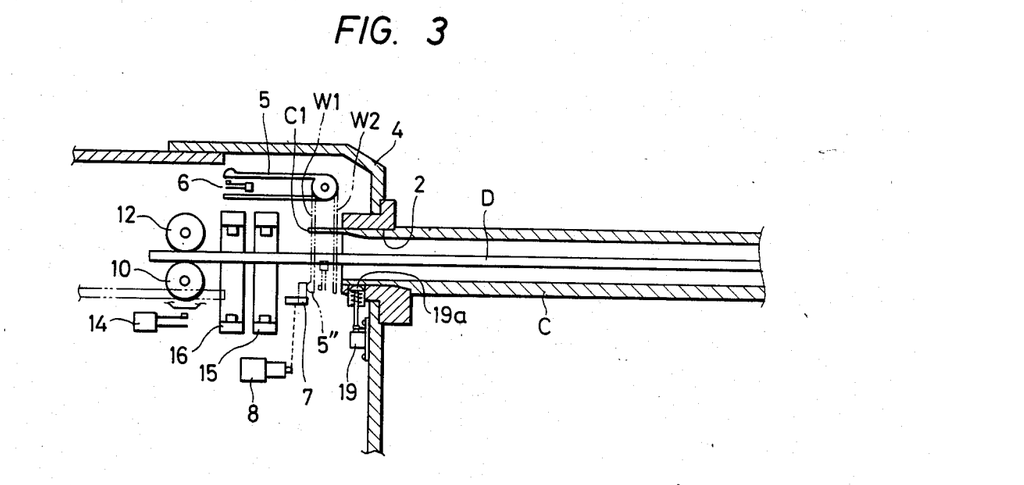
FIG. 3 is a view similar to FIG. 2 and showing the disc accompanied by a protective disc case.

FIG. 1 shows an optical disc player P to which apparatus according to the present invention is applicable. As FIG. 1 shows, the optical disc player P has a housing 1 that is provided at the front thereof with an opening 2 for disc insertion and with a control panel 4, on which several control buttons 3 are mounted. As FIGS. 2 and 3 show, on the inside of the opening 2, a lid 5 is provided. The lid 5 is constructed so that it can be opened by a leading edge Dl of a disc D (FIG. 2) when the disc D is inserted through the opening 2 into the housing 1 or by the front end Cl of a disc case C (FIG. 3) that contains the disc D when the disc case C is engaged within the opening 2.

The lid 5 has a double-wall body having flexible walls W1 and W2 and containing a switch 6 therein and is mounted at one edge on a shaft 5' in such a manner as to be rotatable within the housing 1 through an angle of substantially 90°. Rotation of the lid 5 thus selectively enables or prevents access to the interior of the housing 1. A movable locking member 7 is provided in the housing 1. When the lid 5 is closed, the locking member 7 is adapted for contact with the free end 5" of the double-wall body of the lid 5 (i.e., the end remote from the shaft 5'). The movable locking member 7 is driven by a solenoid 8 so as selectively to engage the end 5" of the double-wall body of the lid 5 so that the lid 5 is locked and to become disengaged from the lid 5 so that the lid 5 is unlocked.

FIGS. 2 and 3 show an embodiment of a disc loading and unloading apparatus according to the present invention that is adapted to be used with apparatus of the type shown in FIG. 1.

A drive roller 10 is provided for engagement with a disc D inserted into the housing 1 through the opening 2. The disc D may be inserted directly into the housing 1 through the opening 2 or may be drawn out of a disc case C engaged in the opening 2. Any suitable disc handling device may be provided in the housing 1 for the purpose of withdrawing the disc D from its case C. The roller 10 is driven in rotation by a motor 11 (FIG. 2). An idler roller 12 is provided for cooperation with the drive roller 10 so that the disc is received between the drive roller 10 and idler roller 12. The drive roller 10 and idler roller 12 are supported by a movable supporting member (not shown in the drawings) so as to be able to ascend and descend selectively, and constitute a loading and unloading mechanism for loading the disc D on or unloading the disc D from a disc rotating device 13 (FIG. 2) provided in the housing 1.

A switch 14 is provided for cooperation with the movable supporting member by which the drive roller 10 and idler roller 12 are supported. The switch 14 is engageable with the movable supporting member in such a manner as to be turned on when the drive roller 10 and idler roller 12 are driven to descend. Between the opening 2 on the one hand and the drive roller 10 and idler roller 12 on the other, optical switches 15 and 16 are provided. The optical switch 15 has a light emitting element 15a and a light receiving element 15b between which the disc D passes at certain stages of the operation of the apparatus. The light emitted by the light emitting element 15a and received by the light receiving element 15b is interrupted when the disc D is positioned between the light emitting element 15a and the light receiving element 15b, so that the optical switch 15 is turned off. The optical switch 16 has a light emitting element 16a and a light receiving element 16b between which the disc D passes at certain stages of the operation of the apparatus. The optical switch 16 operates in the same manner as the optical switch 15. The light emitted by the light emitting element 16a and received by the light receiving element 16b is interrupted by the disc D when the latter is positioned between the light emitting element 16a and the light receiving element 16b, so that the optical switch 16 is turned off. An optical switch 17 is provided on the side of the disc rotating device 13 which is diametrically opposite the opening 2. The optical switch 17 has a light emitting element 17a and a light receiving element 17b between which a peripheral portion of the disc D is positioned when the disc D is loaded on the disc rotating device 13, and the light emitted by the light emitting element 17a and received by the light receiving element 17b is interrupted by the peripheral portion of the disc D when the latter is positioned between the light emitting element 17a and the light receiving element 17b, so that the optical switch 17 is turned off.

In addition to the various switches mentioned above, discriminating means such as a switch 19 is provided near the opening 2 in the housing 1 for detecting the presence or absence of the disc case C within the opening 2. The discriminating switch 19 incorporates an actuator 19a. The actuator 19a is biased by a spring so that the top portion of the actuator 19a normally projects slightly into the opening 2. The actuator 19a moves downward from the position shown in FIG. 2 to the position shown in FIG. 3 so as to turn the discriminating switch 19 on when the disc case C is engaged with the opening 2.

A control circuit 18 (FIGS. 2 and 5) is provided for controlling the solenoid 8 and the motor 11. Signals obtained from the switches 6 and 14, the optical switches 15, 16 and 17, and the discriminating switch 19, respectively, are supplied to the control circuit 18.

When the disc loading operation in which the disc D is loaded on the disc rotating device 13 is performed, the disc D is inserted in the housing 1 through the opening 2, so that the front end of the disc D is received between the drive roller 10 and the idler roller 12, and the drive roller 10 is caused to rotate by the motor 11. With the rotation of the drive roller 10, the drive roller 10 and the idler roller 12 cooperate to carry the disc D toward the optical switch 17. When the disc D reaches a position above the disc rotating device 13, the drive roller 10 and the idler roller 12 are caused to descend and the disc D is loaded on the disc rotating device 13, as shown by a dot-dash line in FIG. 2. After that, the drive roller 10 and the idler roller 12 release the disc D.

When the disc unloading operation in which the disc D is unloaded from the disc rotating device 13 is performed, the drive roller 10 and the idler roller 12 are caused to come into contact with the disc D on the lower and upper sides thereof, respectively, so that the disc D is held between the drive roller 10 and the idler roller 12, and driven to ascend together with the disc D so as to remove the disc D from the disc rotating device 13. Then the drive roller 10 is driven by the motor 11 to rotate in the direction opposite to the direction of rotation in the disc loading operation, so that the drive roller 10 and idler roller 12 cooperate to carry the disc D toward the opening 2. After the rotation of the drive roller 10 is completed, the disc D is held so that it extends through the opening 2. If a disc case C is engaged within the opening 2 from the outside of the disc player, a portion of the disc D is received within the disc case C. If a disc case C is not engaged within the opening 2 from the outside of the disc player, the portion of the disc D that would have been received within the disc case C is simply exposed through the opening 2 to the outside of the disc player. Under either condition, another portion of the disc D remains held between the drive roller 10 and the idler roller 12.

When the disc D is inserted into the housing 1 through the opening 2, the double-wall body of the lid 5 is pushed by the front end D1 of the disc D or the front end C1 of the disc case C. The flexible walls W1 and W2 press in on the switch 6 mounted therebetween and in this manner the switch 6 is turned on. When the switch 6 is turned on, the control circuit 18 (FIGS. 2 and 5) causes the movable locking member 7 to release the lid 5 from the locked state, and the lid 5 is rotated by the front end of the disc D or disc case C toward the inside of the housing 1 so as to be opened.

After the disc unloading operation is carried out as described above, if the disc D is not accompanied by a disc case, the time during which the disc D is held in the opening 2 is measured by a timer 23 contained in the control circuit 18, and the disc loading operation is executed automatically by the loading and unloading mechanism when the measured time reaches a predetermined value. If the disc D is accompanied by a disc case C, that is, the disc case C is engaged within the opening 2, the measure of time by the timer 23 contained in the control circuit 18 is not carried out, and the disc loading operation is not executed regardless of the time during which the disc D is held in the opening 2 following the disc unlading operation. Such operation following the disc unloading operation is performed under the control of the control circuit 18.

Figure 4:
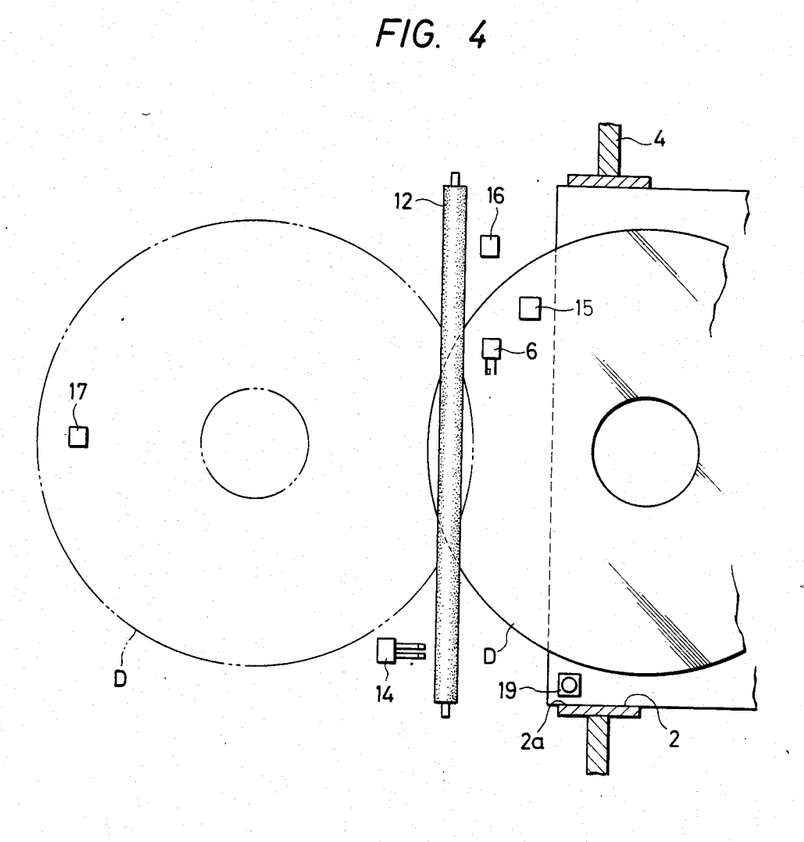
FIG. 4 is a schematic top plan view of the apparatus of FIGS. 2 and 3.
Figure 5:
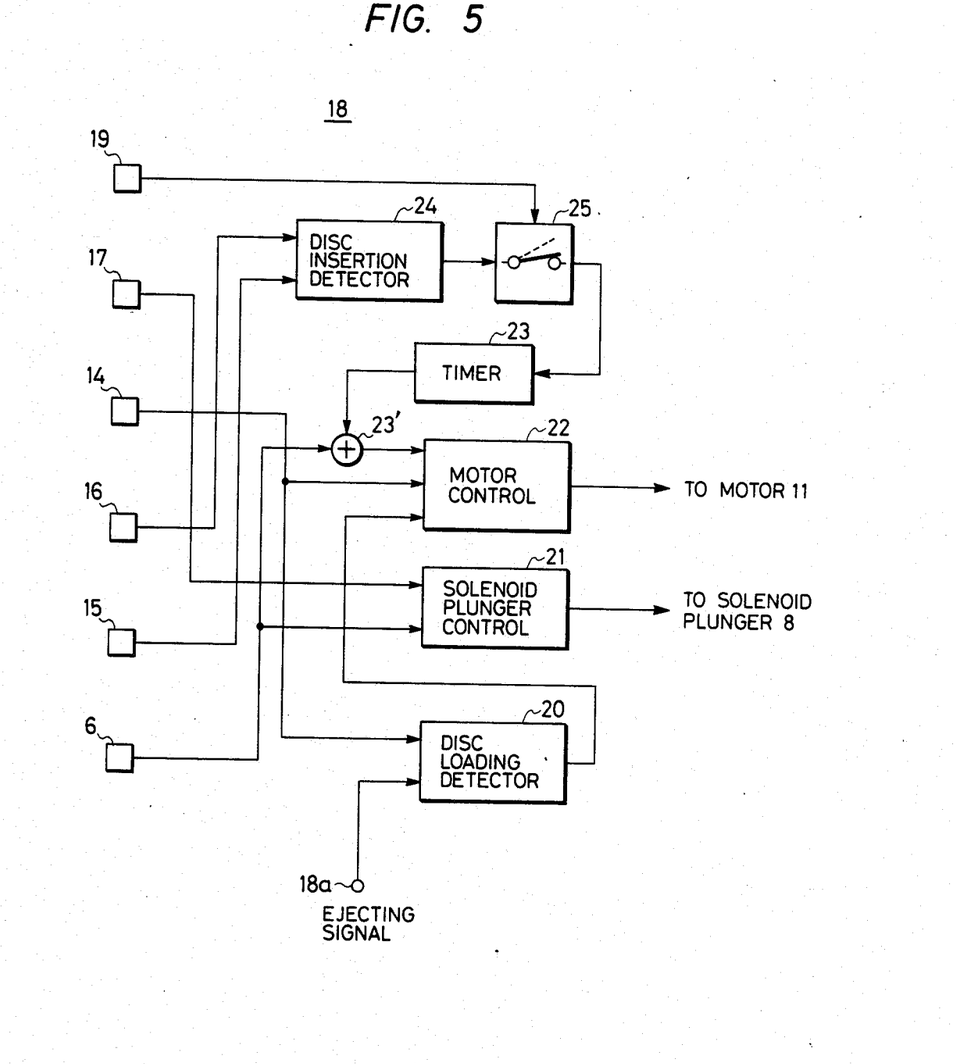
FIG. 5 is a block diagram facilitating an understanding of the operation of apparatus in accordance with the invention.

FIGS. 4 and 5 explain the operation of the control circuit 18.

FIG. 4 illustrates the positional relations among the switches 6 and 14, the optical switches 15, 16 and 17, and the discriminating switch 19, each of which supplies a signal to the control circuit 18.

The switch 6 is positioned above the disc D being held at the opening 2, and the switch 14 is positioned so as to engage the movable supporting member by which the drive roller 10 and the idler roller 12 are supported. The optical switch 15 is so located that the light emitted by the light emitting element 15a towards the light receiving element 15b is interrupted by the disc D being held at the opening 2 so as to turn the optical switch 15 off, while the optical switch 16 is so located that the light emitted by the light emitting element 16a towards the light receiving element 16b is not interrupted by the disc D while the latter is being held at the opening 2 or loaded on the disc rotating device 13. Under these two conditions, therefore, the optical switch 16 is turned on. The optical switch 17 is so located that the light emitted by the light emitting element 17a towards the light receiving element 17b is interrupted by the disc D while the latter is being loaded on the disc rotating device 13 so as to turn the optical switch 17 off. The discriminating switch 19 is positioned near the end 2a (FIG. 4) of the opening 2 and is turned off when the disc case C is not engaged within the opening 2, since in that situation the actuator 19a of the switch 19 projects into the opening 2 (FIG. 2). The detecting switch 19 is turned on when the disc case C is engaged within the opening 2, since in that situation the actuator 19a of the switch 19 is depressed by the front end of the disc case C (FIG. 3).

The control circuit 18 (FIGS. 2 and 5) contains disc loading detecting means 20 for sensing the presence of the disc D in the loaded position, solenoid control means 21 for supplying an actuating signal to the solenoid 8, motor control means 22 for supplying a control signal to the motor 1, timer means 23, disc insertion detecting means 24 for detecting the insertion of the disc D in the opening 2, and switching means 25. The signals obtained respectively from the switches 6 and 14, the optical switches 15, 16 and 17, and the case discriminating switch 19 are suppled to the control circuit 18 thus constituted, and in addition an ejecting signal is also selectively supplied from a terminal 18a.

In the disc loading operation performed by the loading and unloading mechanism, when the lid 5 (FIGS. 2 and 3) is pushed by the front end D1 of the disc D or the front end C1 of the disc case C and thereby the switch 6 is turned on, as described above, the solenoid control 21 (FIG. 5) supplies an actuating signal to the solenoid 8 (FIGS. 2 and 3) to actuate the solenoid 8. Consequently, the movable locking member 7 releases the lid 5 from the locked state. Simultaneously, the motor control 22 supplies a control signal to the motor 11 to rotate the motor in the normal rotating direction (loading direction) so that the drive roller 10 is correspondingly rotated. The drive roller 10 and the idler roller 12 thus cooperate to carry the disc D, which is inserted directly into the housing 1 through the opening 2 or withdrawn from the disc case C engaged within the opening 2, to a predetermined position above the disc rotating device 13. When the disc D reaches the position above the disc rotating device 13, the drive roller 10 and idler roller 12 are driven to descend together with the disc D, so that the disc D is loaded on the disc rotating device 13 (FIG. 2). Although each of the optical switches 15 and 16 is first turned off and then turned on again during the movement of the disc D described above, the control circuit 18 is constructed with a lockout or delay means (not shown) so as not to be influenced by the signals obtained from the optical switches 15 and 16 during the disc loading operation.

When the disc D is placed on the disc rotating device 13 and the switch 14 is turned on by the moving support member by which the drive roller 10 and the idler roller 12 are supported, the motor control means 22 causes the motor 11 to stop rotating. The on signal obtained from the switch 14 is supplied also to the disc loading detector 20. Further, in the situation where the disc D is on the disc rotating device 13, the optical switch 17 is turned off and the solenoid control 21 causes the solenoid 8 to be inoperative. Consequently, in the case where the disc D without the disc case C has been inserted into the housing 1, the lid 5 is closed and locked by the movable locking member 7 after the disc D has passed the opening 2.

In the disc unloading operation performed by the loading and unloading mechanism, an ejecting signal is supplied through the terminal 18a (FIGS. 2 and 5) to the disc loading detector 20 in the situation where the disc D is loaded on the disc rotating device 13 (FIG. 2). The disc loading detector 20 detects or confirms the presence of the disc D on the basis of the ejecting signal and the on signal from the switch 14 and supplies a disc loading detection signal to the motor control 22. The motor control 22 supplies the actuating signal to the motor 11 to rotate the motor 11 in the reverse rotating direction (unloading direction) in response to the disc loading detection signal from the disc loading detector 20. With the rotation of the motor 11 in the reverse direction, the drive roller 10 and the idler roller 12 are driven to ascend together with the disc D, so that the disc D is removed from the disc rotating device 13, and the drive roller 10 is rotated in the direction opposite to the direction of rotation in the disc loading operation. As a result of this, the disc D is carried toward the opening 2 and then held in the opening 2.

When the disc D is held in the opening 2 through the disc unloading operation thus performed, the optical switch 15 is turned off and the optical switch 16 is turned on (see the solid outline of the disc D in FIG. 4). The disc insertion detector 24 (FIG. 5) detects or confirms that the disc D is being held at the opening 2 on the strength of an off signal obtained from the optical switch 15 and an on signal obtained from the optical switch 16. The disc insertion detector 24 then supplies a detection signal through the switch 25 (only if the latter is closed) to the timer 23 as long as the disc D is held at the opening 2. The switch 25 is controlled by a signal supplied from the discriminating switch 19. When the discriminating switch 19 is in the off state and supplies an off signal to the switch 25, that is, when the disc case C is not engaged within the opening 2, the switch 25 is closed (turned on) as shown by a solid line in FIG. 5. On the other hand, when the switch 19 is turned on and supplies an on signal to the switch 25, that is, when the disc case C is engaged within the opening 2, the switch 25 is open (turned off) as shown by a broken line in FIG. 5.

Accordingly, when the disc D, not accompanied by the disc case C, is held at the opening 2, the detection signal from the disc insertion detector 24 is supplied through the switch 25 to the timer 23. The timer 23 then measures the time in response to the detection signal from the disc insertion detector 24 and supplies a timer output signal through a junction 23' to the motor control 22 when the measured time reaches a predetermined value—for example, fifteen seconds. The motor control 22 supplies the drive signal to the motor 11 to rotate the motor 11 in the normal rotating direction in response to the timer output signal from the timer 23. With the rotation of the motor 11 in the normal rotating direction, the drive roller 10 is driven again to carry the disc D to a position above the disc rotating device 13. After the disc D reaches such position above the disc rotating device 13, the drive roller 10 and the idler roller 12 are driven to descend together with the disc D, and finally the disc D is loaded on the disc rotating device 13. Then the control circuit 18 terminates its control operation and the disc D is continuously held on the disc rotating device 13.

When the disc D is accompanied by the disc case C and is held at the opening 2, the detection signal from the disc insertion detector means 24 is not supplied to the timer 23, since the switch 25 is kept in the open or off state. Accordingly, the timer 23 does not operate to measure the time. The timer output signal from the timer 23 is therefore not supplied to the motor control 22, and the motor 11 is not driven to rotate in the normal rotating direction. As a result, the disc D is continuously held at the opening 2 with a portion thereof inserted into the disc case C which is engaged within the opening 2.

In the manner described above, in the case where the disc D is not accompanied by the disc case C and is held at the opening 2 by the loading and unloading mechanism, the disc loading operation is automatically executed again by the loading and unloading mechanism so as to load the disc D on the disc rotating device 13 after the disc has been continuously held at the opening 2 for a period in excess of a predetermined duration. Accordingly, the disc D is prevented from being continuously held over a long period of time at the opening 2 with a portion thereof exposed to the outside of the housing 1.

In the case where the disc D is accompanied by the disc case C and is held at the opening 2 by the loading and unloading mechanism, the loading and unloading mechanism is prevented from executing the disc loading operation in the manner described above. The disc case C is therefore capable of being removed from the housing 1 without undesirable waiting time.

In the embodiment described above, when the disc D is accompanied by the disc case C and is held at the opening 2 following the disc unloading operation, the switch means 25 is kept in the open or off state so as to prevent the detection signal from the disc insertion detector 24 from being supplied to the timer 23. The disc D is therefore continuously held at the opening 2. Of course, it is within the scope of the invention to employ various other ways for maintaining the disc D accompanied by the disc case C at the opening 2.

Thus there is provided in accordance with the invention a novel and highly-effective disc loading and unloading apparatus for use in disc players. The apparatus avoids the disadvantages described above that are inherent in conventional disc loading and unloading apparatus. The apparatus automatically loads and unloads a disc onto and from a disc rotating device, carries the unloaded disc to the opening for disc insertion so that it protrudes though the opening, and selectively permits it to remain there indefinitely if a disc case is engaged in the opening for disc insertion, so that the protruding portion of the disc is protected, or automatically reloads the disc after a predetermined time interval if no disc case is engaged in the opening.

Many modifications of the preferred embodiment of the invention described above will readily occur to those skilled in the art upon consideration of this disclosure. For example, the control logic can be reversed so that, for example, the switch 6 responds to pressure by the front end D1 of the disc D or the front end C1 of the disc case C by turning off instead of by turning on, and the operation of the switches 19 and 25, etc., may be similarly reversed. Accordingly, the invention is not limited except by the appended claims.

We claim:

1. Apparatus for use in a disc player; comprising:
    loading and unloading means for performing selectively a disc loading operation in which a disc inserted into the disc player through an opening for disc insertion is carried to and loaded on a disc rotating device and a disc unloading operation in which the disc is removed from the disc rotating device, returned to said opening, and positioned therein with a portion of said disc protruding through said opening so that said portion is exposed to the outside of the disc player or received within a disc case engaged within said opening;
    discrimination means for detecting the presence or absence of a disc case engaged within said opening; and
    drive control means responsive to said discrimination means for controlling said loading and unloading means to reload said disc a predetermined time after said disc is positioned in said opening if no disc case is engaged within said opening and to allow said disc to remain indefinitely in said opening if for protection of said disc a disc case is engaged in said opening.

2. Apparatus according to claim 1; wherein said loading and unloading means comprises a pair of rollers for receiving said disc therebetween and drive means for rotating at least one of said rollers so as to transport the disc between said rollers.

3. Apparatus according to claim 2; wherein said drive means comprises a motor for rotating one of said rollers.

4. Apparatus according to claim 1; wherein said discrimation means comprises switch means mounted near said opening, said switch means being biased to assume a first condition and moved to assume a second condition in response to engagement of a disc case in said opening.

5. Apparatus according to claim 4; wherein said switch means comprises a switch and an actuator having one portion connected to said switch for operation thereof and another portion projecting into said opening and movable by a disc case engaged within said opening.

6. Apparatus according to claim 1; wherein said drive control means comprises a control circuit for supplying a drive signal to said loading and unloading means to cause said loading and unloading means to operate in selected periods and detecting means for detecting the presence of said disc at predetermined positions and supplying disc detection output signals to said control circuit so as to determine said selected periods.

7. Apparatus according to claim 6; wherein said control circuit comprises timer means for determining when said disc has been continuously held at said opening for a predetermined time following the disc unloading operation under the condition that said discrimation means detects the absence of said disc case and for producing a time detection output, and motor control means responsive to said time detection output for generating said drive signal.

8. Apparatus according to claim 7; wherein said timer means commences a time measurement at the beginning of a period in which said disc is held at said opening under the condition that said discrimination means detects the absence of said disc case and generates said time detection output when the measured time reaches said predetermined time.

9. Apparatus according to claim 6; wherein said detecting means comprises a plurality of switches each operative to assume selectively on and off states in accordance with the position of the disc.

* * * * *